(12) United States Patent
Zhang et al.

(10) Patent No.: US 12,745,086 B2
(45) Date of Patent: Sep. 22, 2026

(54) IPSEC SEQUENCE SYNCHRONIZATION AND RECOVERY IN SOFTWARE-DEFINED WIDE AREA NETWORK(S)

(71) Applicant: Cisco Technology, Inc., San Jose, CA (US)

(72) Inventors: Qingguo Zhang, Beijing (CN); Shuang Han, Da Lian (CN); Bo Gao, Da Lian (CN); Changhong Shen, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 18/933,031

(22) Filed: Oct. 31, 2024

(65) Prior Publication Data

US 2026/0122498 A1 Apr. 30, 2026

(51) Int. Cl.
*H04W 12/088* (2021.01)
*H04W 12/033* (2021.01)

(52) U.S. Cl.
CPC ....... *H04W 12/088* (2021.01); *H04W 12/033* (2021.01)

(58) Field of Classification Search
CPC .......................... H04W 12/088; H04W 12/033
See application file for complete search history.

(56) References Cited

U.S. PATENT DOCUMENTS 8,018,956 B1 9/2011 Deng et al.
12,323,335 B2* 6/2025 Zhou .................... H04J 3/0697
2001/0052072 A1* 12/2001 Jung .................. H04L 63/0428 713/160
2012/0281522 A1* 11/2012 Kumar ................. H04L 1/1809 370/217
2022/0217093 A1 7/2022 Zhou et al.
2023/0412423 A1* 12/2023 Krovatkina ........... H04L 45/655
2024/0163030 A1* 5/2024 Zhu ...................... H04L 1/0076

OTHER PUBLICATIONS

Stackoverflow, "What is happening when a TCP sequence number arrives that is not what is expected?", 2012, https://stackoverflow.com/questions/11747016/what-is-happening-when-a-tcp-sequence-No. arrives-that-is-not-what-is-expecte, 3pg (Year: 2012).*

* cited by examiner

*Primary Examiner* — Han Yang
(74) *Attorney, Agent, or Firm* — Lee & Hayes, P.C.

(57) ABSTRACT

This disclosure describes techniques and mechanisms for providing an automatic and lightweight solution to detect and resolve session stuck failure(s) due to erroneous anti-replay packet drops in SDWAN networks. The techniques may operate in a data plane of the network devices, such as part of an anti-replay feature. The techniques may enable a sending and receiving edge device to communicate via secure tunnels. The receiving edge device may detect an out-of-window error and may generate and send, within the data plane, a message that includes a set control bit to trigger the sending edge device to perform a synchronization and recovery process.

16 Claims, 8 Drawing Sheets

IPSEC SEQUENCE SYNCHRONIZATION AND RECOVERY IN SOFTWARE-DEFINED WIDE AREA NETWORK(S)

TECHNICAL FIELD

The present disclosure relates generally to the field of computer networking, and more particularly to detecting and resolving session stuck failure(s) due to erroneous anti-replay packet drops in software-defined wide area networks (SDWANs).

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IOT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, software-defined (SD) WANs, cloud networks, and so forth.

These networks often include specialized network devices to communicate packets representing various data from device-to-device, such as switches, routers, servers, access points, and so forth. Each of these devices is designed and configured to perform different networking functions. For instance, switches may allow devices in a network to communicate with each other. Routers connect multiple networks together, and also connect computers on those networks to the Internet, by acting as a dispatcher in networks by analyzing data being sent across a network and choosing an optimal route for the data to travel. A wireless access point may be a network device that allows devices with wireless capabilities to connect to a wired network.

SDWAN is an example network where edge devices may establish secure association (SA) sessions and may utilize secure tunnels (e.g., such as internet protocol (IP) security (IPSec) Tunnels) in the data plane to enable bi-directional traffic between the edge devices. The edge device(s) may implement features to protect data packets from malicious actors, such as an anti-replay feature. However, situations may occur that cause data packets to be dropped unexpectedly by a receiving edge device. In order to recover the dropped packets, current techniques relate to manually rekeying the secure association session between the edge devices, or rekeying the secure association via the command line. However, this not only requires an increase in communications between controllers and the edge devices, resulting in an increase in processing and resource use of the network, but it also increases the time a secure association session between the edge devices is stuck due to the error. Moreover, current techniques operate in the control plane, resulting in heavyweight synchronization or recovery mechanisms, which are cumbersome and may impact service of one or more remote site(s) in a SDWAN.

Accordingly, there is a need for an automatic and lightweight solution to detect and resolve session stuck failure(s) due to erroneous anti-replay packet drops.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
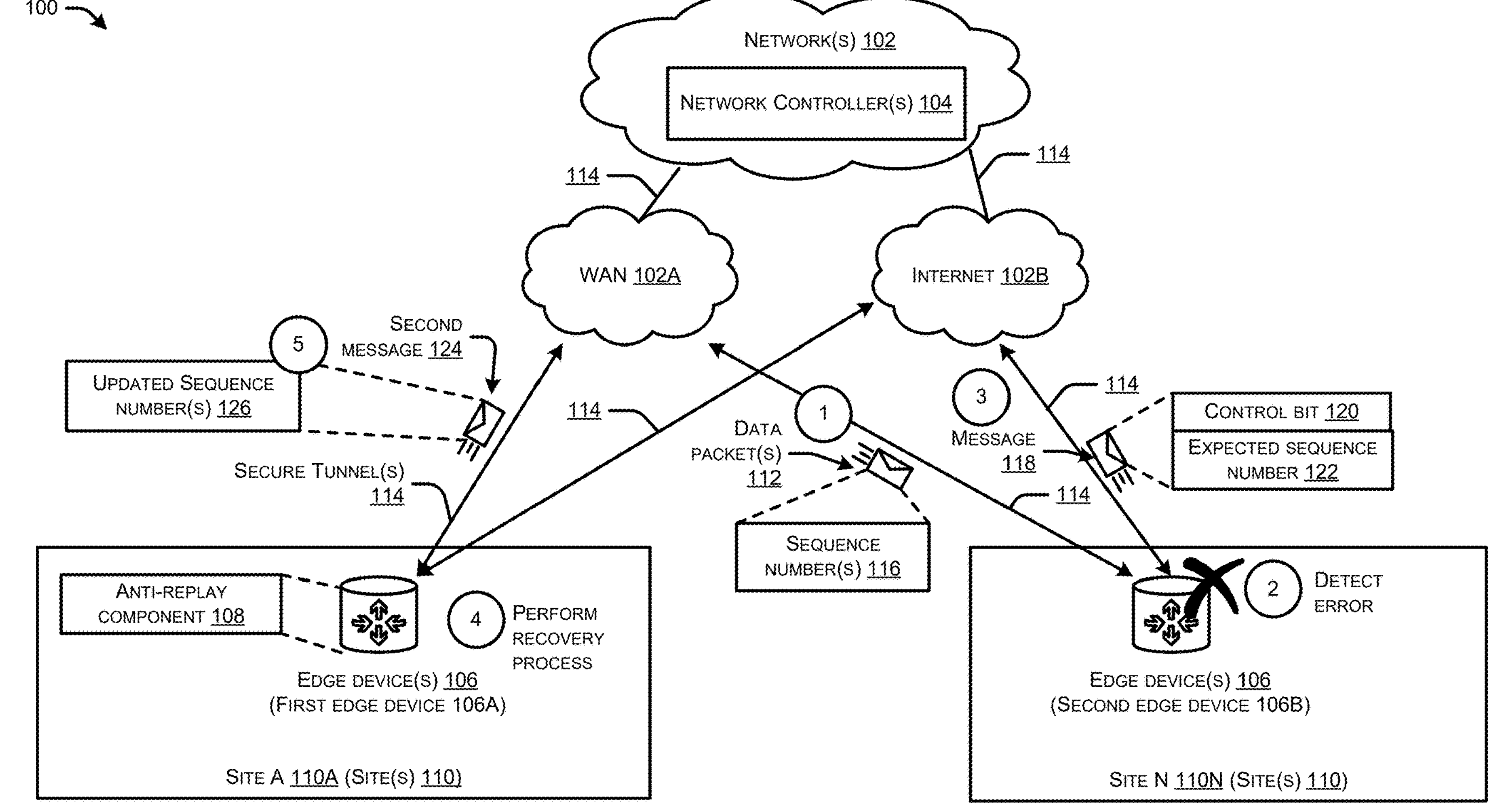
FIG. 1 illustrates a system-architecture diagram of an environment in which a system can provide an automatic and lightweight solution to detect and resolve session stuck failure(s) due to erroneous anti-replay packet drops in SDWAN networks.

The present disclosure relates generally to the field of computer networking and more particularly to detecting and resolving session stuck failure(s) due to erroneous anti-replay packet drops in SDWAN networks.

A method to perform the techniques described herein may be implemented at least in part by an edge device of a SDWAN network and may include receiving, from a first edge device and at a second edge device within the SDWAN, first data packets comprising sequence numbers. The method may include determining, by the second edge device, that an out of window error has occurred at the second edge device. Further the method may include generating, by the second edge device, a first message comprising an expected sequence number. Additionally, the method may include sending the first message to the first edge device, the first message causing the first edge device to perform a recovery process. The method may also include receiving, from the first edge device and based at least in part the recovery process, one of a second message or second data packets comprising the expected sequence number. The method may include updating, by the second edge device, a stored sequence number value based on the expected sequence number.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

As noted above, SDWAN is an example network. In such networks, edge devices may establish secure tunnels (e.g., such as IPSec Tunnels) in the data plane to enable bi-directional traffic between the edge devices. The edge device(s) may implement features to protect data packets from malicious actors, such as an anti-replay feature. For example, the anti-replay feature may protect data traffic from a malicious actor that attacks the network using a "replayed" or duplicate data packet. Each data packet may be identified by a receiver edge device using a sequence number included in the data packet. Where the sequence number is a duplicate or is out of a sequence window range, the anti-replay feature may drop the data packet.

In some examples, the sequence number included in a data packet sent by a sender edge device may be outside of or far below a sequence number and/or the sequence window range stored by the receiver edge device. In this example, an out-of-window (OOW) error is detected by the receiver and the data packet gets dropped. In such cases, detection of the OOW error occurs on the receiver edge device, however, the receiver edge device is not aware of what occurred on the sender's side. For instance, OOW errors may be triggered where the sequence numbers of the sender and receiver edge devices are out of sync (e.g., an out of sync error occurs, such as where OOW errors are continuous or persistent for a period of time). An out of sync error can cause the receiver edge device to be stuck on a higher or lower sequence value and drop data packets received from the sender device, resulting in in the secure association session between the edge devices to stall.

In some examples, causes of the sequence numbers being out of sync and the receiver edge device to be stuck on a higher sequence value included an IPSec SA delete/add event not being in sync during session recreation, which can be triggered by conditions/events include, but are not limited to: Interface flap, NAT-T address/Port changes, Control connections flap, Duplicate events for IPSec SA delete/add, Connectivity Issues (Latency, Jitter, Packet Drops, Packets out of Order), Rekey not in sync with headless mode, Sequence overflow (sender), Graceful restart, OMP Clear, SW Bug (Event Sequence), etc.

Thus, situations may occur that cause data packets to be dropped unexpectedly by a receiving edge device. In order to recover the dropped packets, current techniques relate to manually rekeying the secure association session between the edge devices, or rekeying the secure association via the command line. However, this not only requires an increase in communications between controllers and the edge devices, resulting in an increase in processing and resource use of the network, but it also increases the time a secure association session between the edge devices is stuck due to the error. Moreover, current techniques operate in the control plane, resulting in heavyweight synchronization or recovery mechanisms. Additionally, when edge devices have anti-replay drops occur, there is currently no mechanism for the edge device to determine why the drops are occurring (e.g., differentiate between whether the drops are occurring due to a security attack or a SA session stuck failure due to an out-of-sync sequence number between edge devices.

Accordingly, there is a need for an automatic and lightweight solution to detect and resolve session stuck failure(s) due to erroneous anti-replay packet drops.

This disclosure describes techniques and mechanisms for providing an automatic and lightweight solution to detect and resolve session stuck failure(s) due to erroneous anti-replay packet drops in SDWAN networks. In some examples, the system may operate in whole or in part in a data plane of network devices. In some examples, the system may receive, from a first edge device and at a second edge device within the SDWAN, first data packets comprising sequence numbers. The system may determine, by the second edge device, that an out of window error has occurred at the second edge device. The system may generate, by the second edge device, a first message comprising an expected sequence number. The system may send the first message to the first edge device, the first message causing the first edge device to perform a recovery process. The system may receive, from the first edge device and based at least in part the recovery process, one of a second message or second data packets comprising the expected sequence number. The system may update, by the second edge device, a stored sequence number value based on the expected sequence number.

In some examples, the system may be performed within a data plane of the network devices. For instance, the secure tunnels may correspond to IPSec tunnels and/or DTLS tunnels.

In some examples, the system may comprise an anti-replay component. The anti-replay component may be implemented on edge device(s) with the network and may operate in a data plane. In some examples, the anti-replay component may be configured to maintain and monitor sequence number data. For instance, the sequence number data may comprise a window size (e.g., a sequence window range), a packet drop counter, a drop threshold value, an out-of-window threshold value, a drop rate, etc.

In some examples, the anti-replay component may be configured to receive traffic from a sender network device via a secure tunnel. The anti-replay component may identify the sequence number(s) included in the packet(s) and determine when an out of window (OOW) error occurs at the receiver network device. In some examples, the OOW error indicates that the sequence number of a packet is outside a value of a configured sequence window stored on the second edge device 106B (e.g., a sequence number in the packet from the sender device is less than a stored sequence window range of the receiver device). Where an OOW error occurs, a counter (e.g., an OOW counter (also referred to as a drop counter herein) may be incremented by the second edge device 106B. Additionally or alternatively, a drop rate of the packets may be determined by the second edge device 106B. Where the OOW counter and/or drop rate reach or exceed respective threshold values, the system may determine that an out of sync error has occurred. In some examples, "out of sync" error may refer to a continuous or persistent increment of the out-of-window counter over a period of time or the continuous or persistent loss of packets over the period of time.

In this example, the anti-replay component may generate a synchronization and recovery message in response to determining the out of sync error has occurred. The synchronization and recovery message may include a set control bit that is configured to trigger a sequence number reset mechanism at the first (sender) network device. The control bit may be part of a header of the synchronization and recovery message (e.g., a control bit within the IPSec header). The synchronization and recovery message may further comprise an expected sequence number associated with the sequence number value stored by the receiver network device. In response to receiving the synchronization and recovery message, the anti-replay component on sender network device may perform a synchronization and recovery process to reset the sequence number on the sender's side. In some examples, such as where the sender network device has traffic to send within a threshold time period, the anti-replay component on the sender network device may send traffic that includes the updated sequence number to the receiver network device. In some examples, such as where there is no traffic to send within the threshold time period, the anti-replay component on the sender network device may send an acknowledgement comprising the updated sequence number to the receiver network device. In some examples, the anti-replay component on the receiver network device may receive the updated sequence number and determine whether to reset the stored sequence number and/or window(s) and range. For instance, the anti-replay component on the receiver network device may determine that the updated sequence number was not updated properly by the sender network device and/or that some other error occurred. In this example, the anti-replay component may generate and send one or more additional synchronization and recovery messages to the sender network device.

In this way, the system may operate within the data plane of the network devices in order to perform sequence synchronization. Moreover, by having the synchronization and recovery process triggered by a single message from the receiver network device, where the receiver network device refrains from sending additional acknowledgement messages to the sender network device, the system reduces the number of messages sent between network devices, thereby improving processing capabilities of the network devices and providing a lightweight solution.

In some examples, the anti-replay component may be configured to determine that the synchronization and recovery process at the data plane of the network device(s) has been unsuccessful for a threshold number of attempts. For instance, the anti-replay component of the receiver network device may store a counter associated with a number of times the recover message is generated and sent.

Once the counter reaches a threshold value, the anti-replay component may determine that an error is occurring on the sender network device side and that a control plane of the receiver network device should be notified in order to start a synchronization and recovery process (e.g., security parameter index (SPI) invalidation and recreation via a specific transport locator (TLOC) update). For instance, the anti-replay component may notify the control plane of the receiver network device, the notification comprising a request for SA invalidation and recreation and including a specific TLOC and system IP. In this example, the control plane of the receiver network device may send a message to network controller(s), the message comprising an SPI invalidation and recreation message and including the specific TLOC and the system IP. The network controllers may, in response to receiving the message, resend keying material to the sender network device along with the specific TLOC and SPI. The sender network device may then recreate and/or reestablish an IPSec SA with the controller(s). The sender network device may send the TLOC invalidation and recreation update and acknowledgement to the receiver network device via the network controllers. The sender network device and the receiver network device may then establish a new IPSec SA, the new SA utilizing a new sequence number value.

In this way, the system may enable a data plane sequence synchronization mechanism, such that network devices can automatically recover a sequence number from erroneous anti-replay drops in SDWAN Networks without manual intervention. Moreover, by having a mechanism that enables the data plane to notify the control plane where synchronization has failed (e.g., such as where there are out of window error(s) or other error(s) occurring at both a sending network device and a receiving network device, the techniques provide a fail safe mechanism to rekey and re-establish secure connections in the control plane, while utilizing fewer communications and conserving processing thus improving processing capabilities of the network devices.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can provide an automatic and lightweight solution to detect and resolve session stuck failure(s) due to erroneous anti-replay packet drops in SDWAN networks. It is understood that any of the components of the system may be implemented on any device in the network 102.

In some examples, the system 100 may include a network 102 that includes network controller(s) 104. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), RA VPNs, VPNs, ZTNA, Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The network controller(s) 104 may correspond to one or more controllers. For instance, the network controller(s) 104 may represent controllers for a particular network and/or service(s) provided by a service provider of the network(s) 102. As an example, the service provider may be Cisco and the network controller(s) 104 may include one or more of Cisco's vManage, Cisco's vSmart, and/or Cisco's vBond controllers for SDWAN network(s).

The edge device(s) 106 may comprise routers, switches, access points, stations, radios, and/or any other network device. In some examples, the edge device(s) 106 may correspond to security engine(s) within the network 102. For instance, the edge device(s) 106 may correspond to one or more transmitter security engine(s) and/or receiver security engine(s). In the examples described herein, the edge device(s) 106 may correspond to edge device(s) within the network(s) 102.

In some examples, the edge device(s) 106 may be configured to communicate with the network controller(s) 104 and/or other edge device(s). As an example, in SDWAN environments, the network controller(s) 104 may establish a control plane for edge device(s), network device(s), etc. across site(s) 110. A first edge device 106A at a first site (e.g., site A 110A) may establish a secure tunnel 114 (e.g., such as a datagram transport layer security (DTLS) tunnel) with the network controller(s) 104 that have dual transport and utilize encrypted DTLS tunnels. A second edge device 106B at a second site (e.g., site N 110N) may also establish a secure tunnel 114 (e.g., a same or separate DTLS tunnel) with the network controller(s) 104 that have dual transport and utilize encrypted DTLS tunnels. The network controller(s) 104 may authenticate the first edge device 106A and the second edge device 106B. In some examples, the network controller(s) 104 may enable peering between all network devices utilizing OMP protocols. The first edge device 106A and the second edge device 106B may receive TLOC and IPSec key information per TLOC from the network controller(s) 104. In response, the first edge device 106A and the second edge device 106B may each automatically build overlay networks with IPSec tunnels to enable peer-to-peer communication (e.g., such as via wireless area network (WAN) 102A (e.g., such as LTE, MPLS, 3G, 4G, or any other connection) for the first edge device 106A and internet 102B for the second edge device 106B). For instance, OMP routes may be established between the edge device(s) and the network controller(s) 104. The OMP routes may operate over DTLS/TLS authenticated and secure tunnels. The edge device(s) may communicate with each other using established IPSec tunnels. The IPSec tunnels may enable the first edge device 106A and the second edge device 106B to send bidirectional traffic that utilized IPSec encapsulation.

In some examples, the edge device(s) 106 may include anti-replay component 108. The anti-replay component 108 may be configured to operate in a data plane of the edge device(s) 106 and/or network(s) 102. In some examples, the anti-replay component may be configured to maintain and monitor sequence number data. For instance, the sequence number data may comprise a window size, a packet drop counter, a drop threshold value, an out-of-window threshold value, etc.

In some examples, the anti-replay component 108 may be configured to receive data packet(s) 112 from the first edge device 106A via a secure tunnel 114. The anti-replay component 108 may identify the sequence number(s) 116 included in the packet(s) and determine when an out of window error occurs at the second edge device 106B. In this example, the anti-replay component 108 may generate a message 118 (e.g., a recovery message and/or sync request message). The message 118 may include a control bit 120 that is configured to trigger a sequence number reset mechanism at the first edge device 106A. The control bit 120 may be part of a header of the message (e.g., a control bit within the IPSec header). The message 118 may further comprise an expected sequence number 122 associated with the sequence number value stored by the second edge device 106B.

In some examples, the system 100 comprises site(s) 110 (e.g., Site A 110A, Site N 110N, etc.) that are configured to communicate with the network(s) 102 and/or network controller(s) 104 via edge device(s) 106 (e.g., first edge device 106A and second edge device 106B). In some examples, the site(s) 110 comprise one or more engine(s), server(s), enterprise network(s), and/or service(s) associated with a service provider, one or more network device(s) (e.g., edge device(s)), etc. In some examples, the site(s) 110 correspond to one or more data center(s) comprising various network components, such as, for example, network switch(es) (also referred to as node(s)) operating on physical servers. In some examples, the site(s) 110 may comprise physical server(s) that may host one or more virtual machines. Each virtual machine may be configured to execute one of various operations and act as one or more virtual components for the cloud network(s) and/or enterprise/application network. In some examples, the physical server(s) may host any number of virtual machines. In some examples, the physical server(s) in the enterprise/application network may host the various network components of the enterprise/application network.

In some examples, the edge device(s) (e.g., such as first edge device 106A) within each site (e.g., such as site A 110A) may be configured to communicate with other edge device(s) (E.g., such as second edge device 106B at site N 110N) using secure tunnel(s) 114. In some examples, the secure tunnel(s) 114 may correspond to a secure tunnel protocol, such as IPSec, DTLS, or any other secure tunnel protocol. In some examples, the edge device(s) 106 may be configured to form secure tunnel(s) 114 with edge device(s) 106 at separate site(s) 110. For instance, a network device at site A 110A may form a secure tunnel 114 with a network device at site N 104N. In some examples, the secure tunnel 114 may be configured to utilize a secure tunnel protocol, such as IPSec, etc. In some examples, the secure tunnels 114 may be associated with a SA session between edge device(s) 106.

As an example, the network controller(s) may assist the edge device(s) in advertises local IPSec Keys via OMP TLOC attributes and publishing the IPSec keys across the SDWAN fabric (via the network controller(s) 104) using Overlay Management Protocol (OMP). In this example, data plane IPSec Tunnels are established automatically between WAN edge device(s). In some examples, NAT-T discovery and traverse between edge devices may be assisted by the network controller(s) 104. In some examples, the edge devices do not utilize a peer-to-peer IKE protocol.

At “1”, the system may send, from a first edge device and to a second edge device, data packet(s) 112 via a secure tunnel 114. For instance, the data packet(s) 112 may correspond to traffic and may comprise sequence number(s) 116 indicating a sequence associated with the individual data packets.

At “2”, the system may detect an error. For instance, the anti-replay component 108 at the second edge device 106B may determine that an OOW error has occurred at the second edge device 106B. As an example, the OOW error may occur where the sequence number on the first edge device 106A (indicated by data packet(s) 112) does not match the sequence number stored by the second edge device 106B. Where the sequence numbers do not match the data packet(s) may be dropped, resulting in service interruptions to end users.

In some examples, the OOW error indicates that the sequence number of a packet is outside a value of a configured sequence window stored on the second edge device 106B (e.g., sequence number in the packet is less than stored sequence window range). Where an OOW error occurs, a counter (e.g., an OOW counter (also referred to as a drop counter herein) may be incremented by the second edge device 106B. Additionally or alternatively, a drop rate of the packets may be determined by the second edge device 106B. Where the OOW counter and/or drop rate reach or exceed respective threshold values, the system may determine that an out of sync error has occurred. In some examples, "out of sync" refers to a continuous or persistent increment of the out-of-window counter over a period of time or the continuous or persistent loss of packets over the period of time.

At "3", the system may send a message 118 (e.g., such as a sequence sync message or recovery message) to the first edge device 106A via the secure tunnel 114. In some examples, the system may send message 118 in response to determining the out of sync error has occurred. The message 118 may include control bit 120 and the expected sequence number 122 (e.g., a value equal to or greater than the sequence number stored by the second edge device 106B).

At "4", the system may perform a synchronization and recovery process at the first edge device 106A. For instance, the system may update a value of the sequence number stored at the first edge device 106A to be equal to the expected sequence number 122.

At "5", the system may send, from the first edge device 106A and to the second edge device 106B via the secure tunnel 114 a second message 124. In some examples, such as where the first edge device 106A determines there is traffic to send within a threshold time period, the second message 124 may comprise data packet(s) that include the updated sequence number 126. In some examples, such as where there is no traffic to send within the threshold time period, the second message 124 may comprise an acknowledgement that includes the updated sequence number 126.

In some examples, the anti-replay component 108 on the second edge device 106B may receive the second message 124 and may determine whether to reset the stored sequence number and/or window(s) and range stored by the second edge device 106B. For instance, where the updated sequence number 126 indicates the first edge device 106A did not perform the recovery successfully (e.g., such as where the updated sequence number is not equal to or greater than the stored sequence number at the second edge device) and/or that some other error occurred (e.g., such as the message 118 being lost or dropped), the anti-replay component 108 may generate and send one or more additional synchronization and recovery messages to the first edge device 106A for a threshold number of retries.

In this way, the system may enable a data plane sequence synchronization mechanism, such that network devices can automatically recover a sequence number from erroneous anti-replay drops in SDWAN Networks without manual intervention. Moreover, by having a mechanism that enables the data plane to notify the control plane where synchronization has failed (e.g., such as where there are out of window error(s) or other error(s) occurring at both a sending network device and a receiving network device, the techniques provide a fail-safe mechanism to rekey and re-establish secure connections in the control plane, while utilizing fewer communications and conserving processing thus improving processing capabilities of the network devices.

Figure 2A:
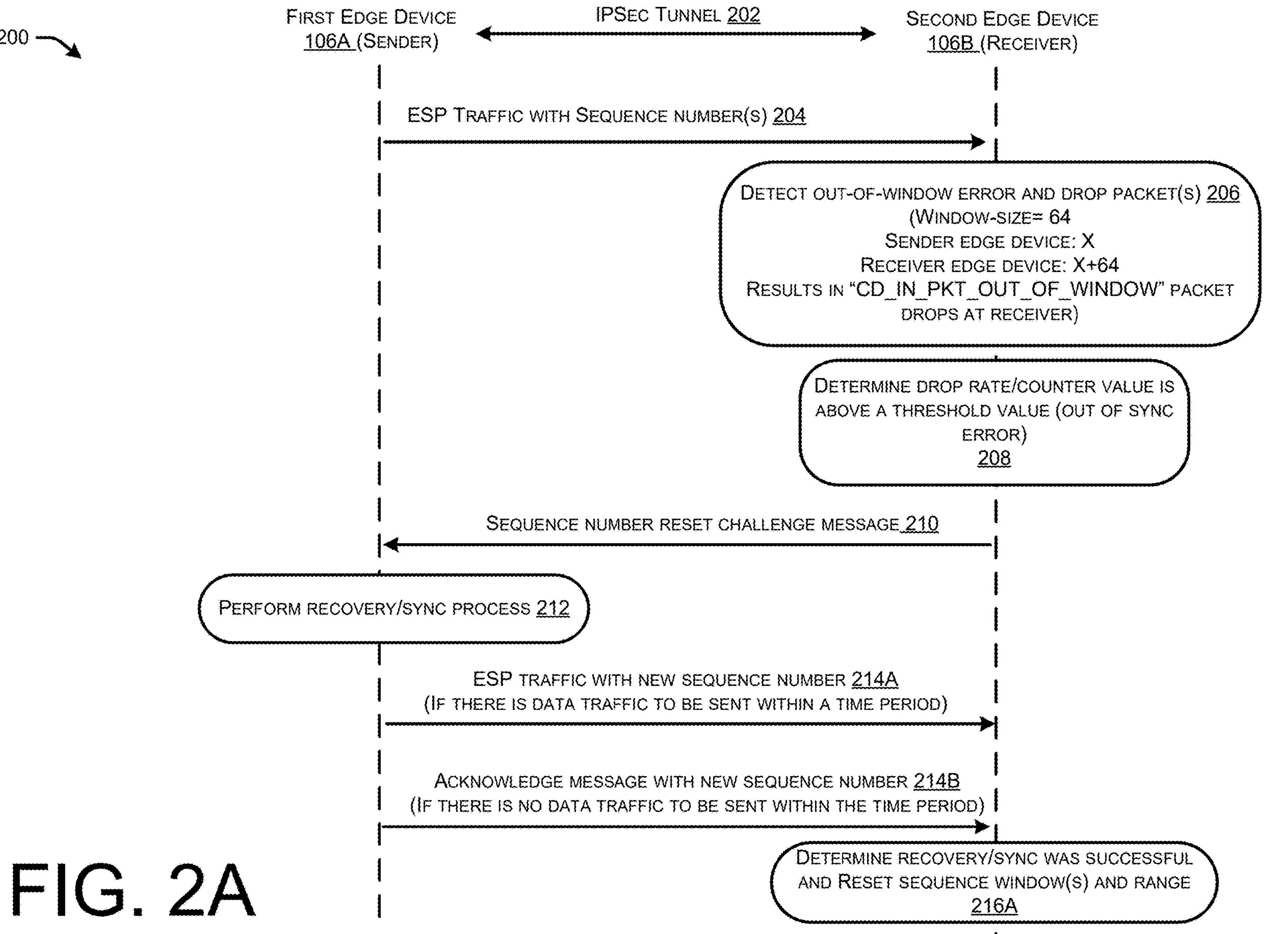
FIGS. 2A-2C illustrate a flow diagram of example communications corresponding to the enabling edge devices to automatically recover sequence number(s) from erroneous anti-replay drops in SDWAN networks.
Figure 2B:
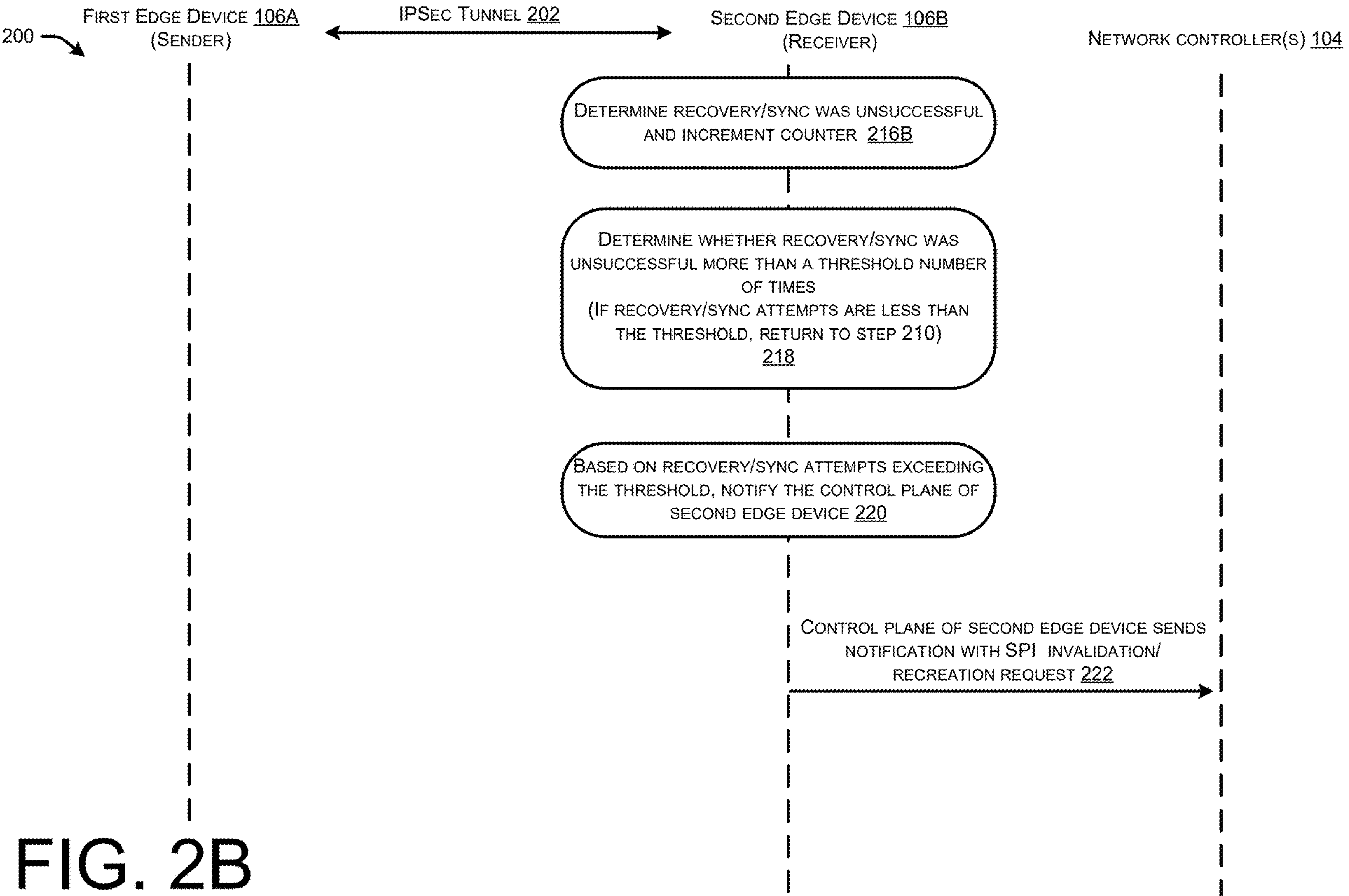
Figure 2C:
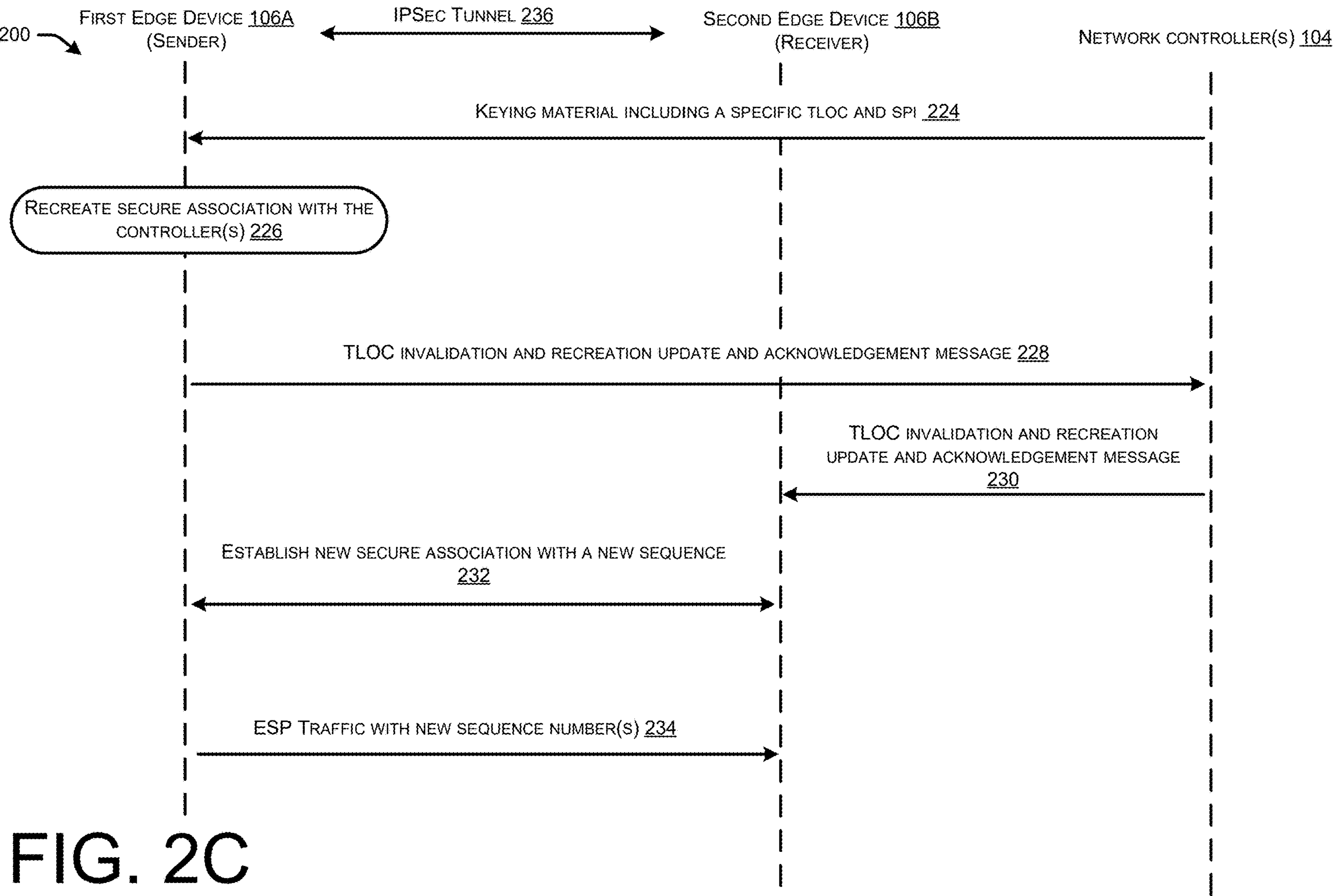

FIGS. 2A-2C illustrate a flow diagram of example communications 200 corresponding to the enabling edge devices to automatically recover sequence number(s) from erroneous anti-replay drops in SDWAN networks. For instance, the communications 200 may correspond to a data plane IPSec sequence synchronization mechanism that enable edge devices 106 to automatically recover IPSec sequence numbers. As illustrated, the system may include a first edge device 106A (e.g., a sender device) and a second edge device 106B (e.g., a receiver device). The first edge device 106A and second edge device 106B may be connected via an IPSec tunnel 202. The IPSec tunnel 202 may correspond to a SA session established between the first edge device 106A and the second edge device 106B via the network controller(s) 104.

As illustrated in FIG. 2A, at 204, the first edge device 106A may send encapsulated security payload (ESP) traffic with sequence number(s) to the second edge device 106B. The ESP traffic may correspond to data packet(s) 112.

At 206, the second edge device 106B may detect an OOW error and, based on the error, may drop packets. As an example, the window size and or range may be set to "64", such that the window range may be equal to values between X+1 (lower value) and X+64 (top value). The first edge device 106A may send ESP traffic with sequence number(s) 116 of value X. The sequence number value stored by the second edge device 106B may be equal to X+64. In this example, the second edge device 106B may determine that an error (e.g., "CD_IN_PKT_OUT_OF_WINDOW") has occurred as the sequence number in the packet is below X+1 and drops the packet(s).

At 208, the second edge device 106B may determine that a drop rate and/or value of a drop counter is above a threshold value. For instance, the second edge device 106B may determine that a number of packet(s) dropped and/or a rate of dropped packet(s) over a period of time exceeds the threshold value. As an example, the rate of the dropped packet(s) may correspond to drops occurring due to OOW errors occurring persistently and/or continuously. In this example, the continuous increment of the drop counter may occur such that the drop counter may exceed the threshold value, indicating an out-of-sync error has occurred at the second edge device 106B.

At 210, the second edge device 106B may generate and send a sequence number reset challenge message to the first edge device 106A. In some examples, the sequence number reset challenge message may be generated in response to the out-of-sync error being detected. The sequence number reset challenge message may correspond to message 118. As described in greater detail below, a control bit in a header of the message (e.g., ESP header, etc.) may be reserved and utilized as a trigger that, when set, causes the first edge device 106A to perform the recovery (e.g., sequence synchronization) process. As noted above, the sequence number reset challenge message also includes an expected sequence number 122.

At 212, the first edge device 106A may perform a synchronization and recovery process. For instance, the first edge device 106A may update the sequence number to be a value equal to or greater than the expected sequence number.

At 214A, the first edge device 106A may send ESP traffic with the new sequence number to the second edge device 106B. For instance, the first edge device 106A may send the ESP traffic where the first edge device 106A determines that there is traffic to be sent within a threshold time period (e.g., such as 100 ms, or any other suitable time period).

At 214B, the first edge device 106A may send an acknowledgement with the new sequence number to the second edge device 106B. For instance, where the first edge device 106A determines that there is no traffic to be sent within the threshold time period, then the first edge device 106A may send the acknowledgement.

At 216A, where the second edge device 106B determines that the synchronization and recovery process was successful, the second edge device 106B may reset sequence window(s) and range associated with the sequence number stored by the second edge device 106B. In this example, the process returns to step 204 and the second edge device 106B continues to receive ESP traffic.

As illustrated in FIG. 2B, at 216B, the second edge device 106B may determine that the synchronization and recovery process was unsuccessful. Where step 216B occurs, one or more of steps 218-234 may also occur. For instance, the second edge device 106B may determine that the synchronization and recovery process was unsuccessful where the new sequence number included in the traffic or acknowledgement from the first edge device 106A is (i) still OOW and/or (ii) is not a value equal to or greater than the expected sequence number. In this example, the system may increment a counter associated with the number of synchronization and recovery attempts in a memory of the second edge device 106B. As illustrated, FIG. 2B additionally includes network controller(s) 104.

At 218, the second edge device 106B determines whether the synchronization and recovery process was unsuccessful for more than a threshold number of attempts. For instance, the system may compare the value of the counter associated with the number of synchronization and recovery attempts to a stored threshold value.

Where the second edge device 106B determines the value of the counter associated with the number of synchronization and recovery attempts is below the threshold number of attempts, the process may return to step 210.

Where the second edge device 106B determines the value of the counter associated with the number of synchronization and recovery attempts is greater than the threshold number of attempts, the process may proceed to step 220.

At 220, the second edge device 106B may, based on the number of synchronization and recovery attempts exceeding the threshold number, notify a control plane of the second edge device. For instance, the anti-replay component 108 of the second edge device 106B may notify a control plane of the second edge device 106B requesting an IPSec SA invalidation and recreation message, as well as a specific TLOC and system IP.

At 222, the control plane of the second edge device 106B may send a notification with an SPI invalidation and recreation request to the network controller(s) 104. As noted above, the second edge device 106B may send the SPI invalidation and recreation message for the specific TLOC and System-IP to the network controller(s) 104.

As illustrated in FIG. 2C, at 224, the network controller(s) 104 may send keying material including a specific TLOC and SPI to the first edge device 106A. Thus, the network controller(s) 104 may send the keying material in response to receiving the SPI invalidation and recreation message.

At 226, the first edge device 106A may recreate a secure association session with the controller(s) (e.g., network controller(s) 104). For instance, the first edge device 106A may build overlay networks using IPSec tunnels to re-enable peer-to-peer communication with the second edge device 106B via a SA session.

At 228, the first edge device 106A may send TLOC invalidation and recreation update and acknowledgement message to the network controllers 104. As illustrated, at 230, the network controllers 104 may push the TLOC invalidation and recreation update and acknowledgement message to the second edge device 106B on behalf of the first edge device 106A. In response to receiving the information from the first edge device 106A, the second edge device 106B may build overlay networks using IPSec tunnels to re-enable peer-to-peer communication with the first edge device 106A.

At 232, the second edge device 106B may establish a new secure association session with the first edge device 106A using a new sequence number value. For instance, one or more OMP routes may be installed over established IPSec tunnels with each transport. Thus, the SA session may enable the first edge device 106A and the second edge device 106B to send traffic bidirectionally with IPSec encapsulation. The first edge device 106A and the second edge device 106B may update stored sequence number values, window sizes, etc. based on recreating the IPSec tunnels.

At 234, the first edge device 106A may send ESP traffic with the new sequence number(s) to the second edge device 106B via the new IPSec tunnel 236.

In this way the system may provide a last resort mechanism that enables the data plane to notify the control plane where sequence synchronization within the data plane has failed (e.g., such as where there are out of window error(s) or other error(s) occurring at both a sending network device and a receiving network device) more than a threshold number of time. Thus, the techniques provide a fail-safe mechanism to rekey and re-establish secure connections in the control plane, while utilizing fewer communications and conserving processing power, thus improving processing capabilities of the network devices.

Figure 3:
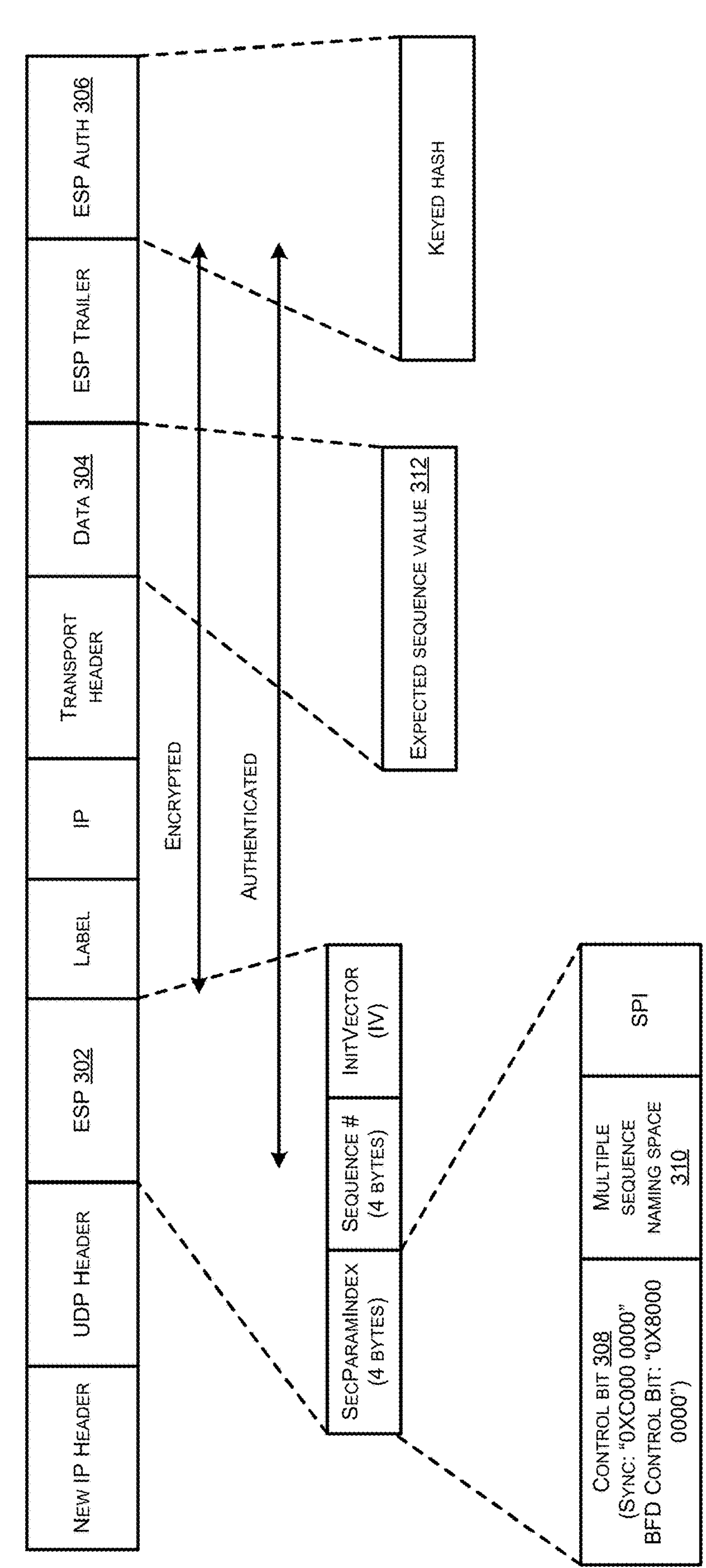
FIG. 3 illustrates an example data packet corresponding to a synchronization and recovery message that may be output by a network device, as described in FIGS. 1 and 2.

FIG. 3 illustrates an exemplary data packet 300 that may be sent to trigger a synchronization and recovery process at a sender network device. For instance, the data packet 300 may correspond to message 118 sent by a receiver network device and/or by the anti-replay component 108 for the data plane. In the illustrated example, the data packet 300 may represent encoding details of an IPSec encapsulated data packet. The data packet 300 may be sent in response to the receiver network device (e.g., second edge device 106B) detecting an out-of-sync error at the receiver network device. In some examples, the data packet 300 may utilize a normal sequence for anti-replay synchronization packet validation, as it may be assumed that the sender network device is not in an "out-of-sync" state.

As illustrated the encapsulated data packet 300 comprises a new IP header (e.g., destination IP address), a UDP header, an encapsulated security payload (ESP) 302 header, label header, IP header (sender IP address), transport header, a payload (e.g., data 304), an ESP trailer, and an ESP authentication 306.

In the illustrated example, the ESP 302 includes a SecParamIndex that is 4 bytes, a sequence number that is 4 bytes, and an InitVector (IV) (e.g., an initialization vector). The SecParamIndex may include a control bit 308, a multiple sequence naming space (MSNS 310), and a security parameter index (SPI) (e.g., an identification tag that enables the system to differentiate between different traffic streams and is used in IPSec for tunneling IP traffic). The control bit 308 represents first 4 bits that are reserved within the ESP 302 and is used as a control message for the data plane. When set, the control bit 308 indicates to the sender network device that an out-of-sync (e.g., OOW error) has occurred at the receiver and the receiver is requesting a sequence number synchronization. As an example, when set, the value of the control bit 308 may comprise "0XC000 0000" or any other suitable value. In another example, such as where bidirectional forwarding detection (BFD) is implemented, the control bit 308 may comprise a value of "0X8000 0000" when set). The MSNS 310 is used to leverage the control bit 308 to classify the message and or indicate a control message and/or a control instruction for the data plane. For instance, the MSNS 310 may be used to is used to leverage the next 3 bits to locate the correct sequence counter in the sequence counter array to check for replay for the given packet.

In the illustrated example, the data 304 may correspond to a payload of the data packet 300. As indicated, the data 304 may comprise an expected sequence value 312. The expected sequence value 312 may represent the sequence number value stored by the receiver network device (e.g., the value that the receiver network device expects the data packet(s) to include as the sequence number). As indicated, the ESP auth 306 header may include a keyed hash, which may represent security utilized by IPSec encapsulation.

Thus, the receiver network device may send the data packet 300 as a sequence sync request when detecting that IPSec SA sequence numbers are OUT-OF-SYNC for inbound traffic. The receiver network device includes the expected sequence value 312 as part of the payload.

As noted above, the sender network device may send an acknowledgement or new traffic with the expected sequence value. The sender may also indicate whether the sender will accept the request when receiving sequence sync request. The receiver network device (which is still in a stuck/stalled state) may validate new packets and update anti-replay sequence window as normal procedure. For instance, the receiver network device may validate the new packets and update the sequence window where the sequence number included in the new packets is greater than or equal to current sequence one in order to avoid packet replay after the sequence recovery is performed. Moreover, when MSNS 310 is used, the sender network device may limit recovery of the sequence values to the corresponding selector and expected sequence will be recovered, as each sub-sequence space work independently.

In this way, the techniques provide a data plane IPSec sequence synchronization mechanism, such that edge devices can automatically and without manual intervention recover IPSec sequence values that would normally be lost due to erroneous anti-replay drops in SDWAN networks, thereby improving data plane operations within networks. Moreover, by leveraging the security of IPSec tunnels, the techniques provide improved security and prevention of anti-replay attacks during stalls and/or synchronization between edge devices.

Figure 4:
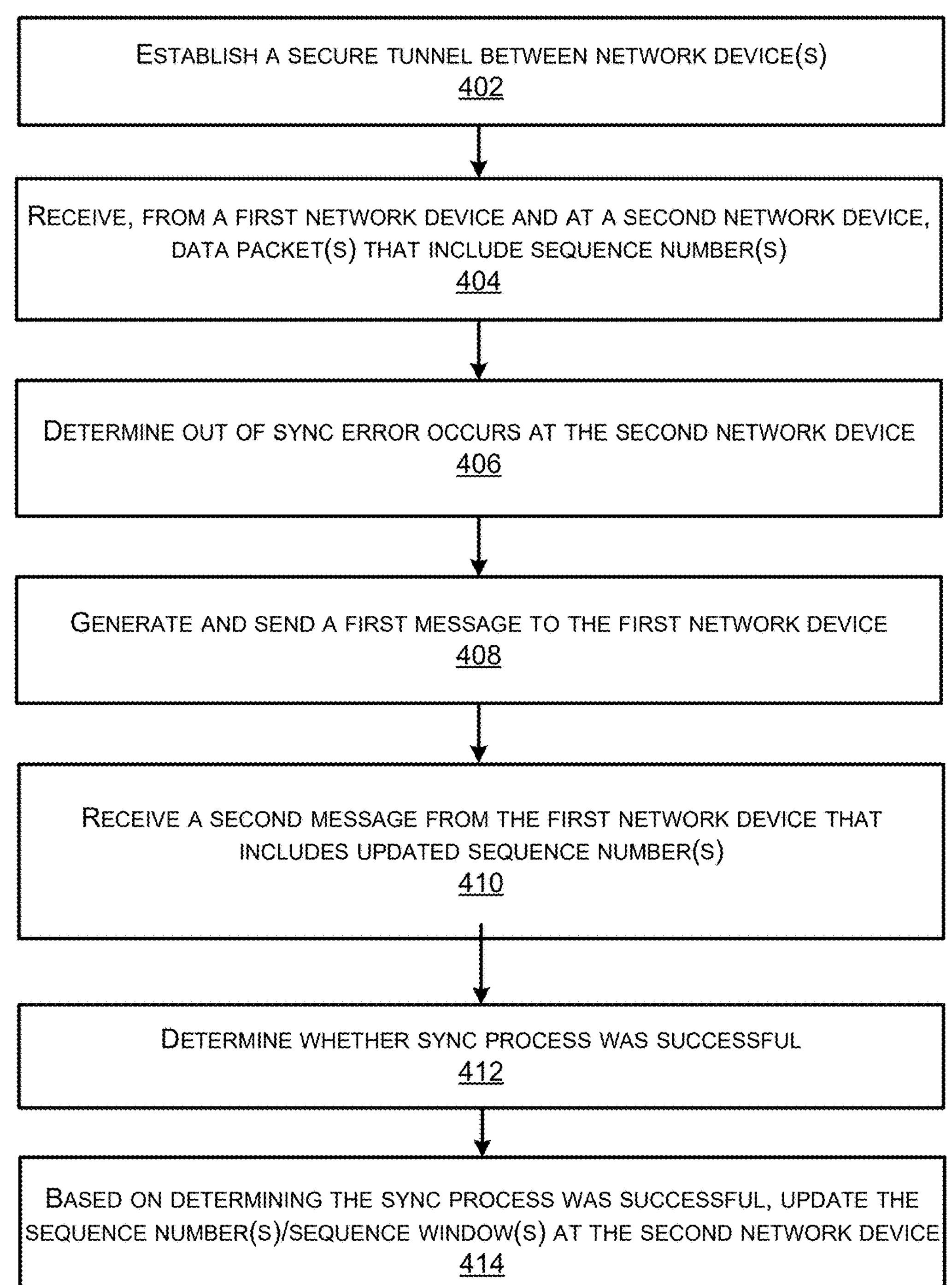
FIG. 4 illustrates a flow diagram of an example method for providing an automatic and lightweight solution to detect and resolve session stuck failure(s) due to erroneous anti-replay packet drops in SDWAN networks, associated with the system described in FIGS. 1-3.

FIG. 4 illustrates a flow diagram of an example system 400 for providing an automatic and lightweight solution to detect and resolve session stuck failure(s) due to erroneous anti-replay packet drops in SDWAN networks, associated with the system described in FIGS. 1-3. In some instances, one or more of the steps of system 400 may be performed by one or more devices (e.g., edge device(s) 106, network controller(s) 104, etc.) that include one or more processors and one or more non-transitory computer-readable media storing computer-executable instructions that, when executed by the one or more processors, cause the one or more processors to perform operations of system 400. As noted above, the system 400 may be performed within a data plane of an SDWAN network.

At 402, the system may establish a secure tunnel between network device(s). For instance, the network device(s) may correspond to edge device(s) 106. As described above, the edge device(s) may establish DTLS tunnels with the network controller(s) 104 and establish peer-to-peer communications via IPSec tunnels. In some examples, the network device(s) may be part of an SDWAN network, such as network(s) 102. In some examples, the first edge device and the second edge device communicate via one or more encrypted DTLS tunnels.

At 404, the system may receive from a first network device and by a second network device, data packet(s) that include sequence number(s). The second network device may monitor and/or maintain a drop rate (e.g., such as via a drop counter) of the data packet(s).

At 406, the system may determine an out of sync error occurs at the second network device. For instance, the out of sync error may be determined based on one or more OOW errors occurring. For instance, the OOW error indicates that the sequence number of a packet is outside a value of a configured sequence window stored on the second edge device 106B (e.g., sequence number in the packet is less than a stored sequence window range). Where an OOW error occurs, a counter (e.g., an OOW counter (also referred to as a drop counter herein) may be incremented by the second edge device 106B. Additionally or alternatively, a drop rate of the packets may be determined by the second edge device 106B. Where the OOW counter and/or drop rate reach or exceed respective threshold values, the system may determine that an out of sync error has occurred. In some examples, "out of sync" refers to a continuous or persistent increment of the out-of-window counter over a period of time or the continuous or persistent loss of packets over the period of time.

In some examples, the second edge device may determine that the out of sync and/or OOW error occurs using the anti-replay component 108, as described above. In some examples, determining the out of sync error occurs comprises determining, by the second edge device that a stored sequence number does not match the sequence numbers in the first data packets, the sequence number being outside of a configured sequence window; dropping one or more of the first data packets; incrementing a drop counter stored by the second edge device; and determining that a drop rate or the drop rate counter is above a threshold value.

At 408, the system may generate and send a first message to the first network device. In some examples, the system may generate and send the first message in response to determining the out of sync error has occurred. For instance, the first message may comprise an expected sequence number 122 and a control bit 120. In some examples, generating the first message further comprises setting a control bit within a header of the message, the control bit causing the first edge device to perform the synchronization and recovery process. In some examples, the first message comprises an IPSec packet and is sent via an IPSec tunnel.

At 410, the system may receive a second message from the first network device that includes updated sequence number(s). For instance, the second message may be sent after the first network device performs the synchronization and recovery process (e.g., also referred to as a sync process or sequence synchronization process). In some examples, the second message may include an indication of whether the first network device accepted a sync request included in the first message. In some examples, the second edge device may refrain from sending an acknowledgement message to the first edge device in response to receiving the second data packets or the second message.

At 412, the system may determine whether the sync process was successful. For instance, the second network device may determine that the updated sequence number is equal to or greater than the stored sequence number at the second edge device.

At 414, the system may, based on determining that the sync process was successful, update the sequence number(s)/sequence window(s) at the second network device.

In some examples, the system may determine, by the second edge device, that the first message (e.g., message 118) has been sent more than a threshold number of times. In this example, based on the message 118 being sent more than the threshold number of times, the system may determine that synchronization between the first edge device and the second edge device within the dataplane is unlikely to succeed due to errors occurring at both the edge device(s). The system may determine that notifying the control plane (e.g., a last resort mechanism) is needed. Accordingly, a data plane of the second edge device may send to a control plane of the second edge device, a notification comprising transport locator (TLOC) data and system IP data; receive, from the first edge device, updated TLOC information; and establish, with the first edge device, a new secure association and a new sequence number.

In this way, the system may provide a data plane-based sequence synchronization mechanism, such that edge devices can automatically and without manual intervention recover IPSec sequence values that would normally be lost due to erroneous anti-replay drops in SDWAN networks, thereby improving data plane operations within networks. Moreover, by leveraging the security of IPSec tunnels, the system may provide improved security by preventing of anti-replay attacks during stalls and/or synchronization between edge devices.

Figure 5:
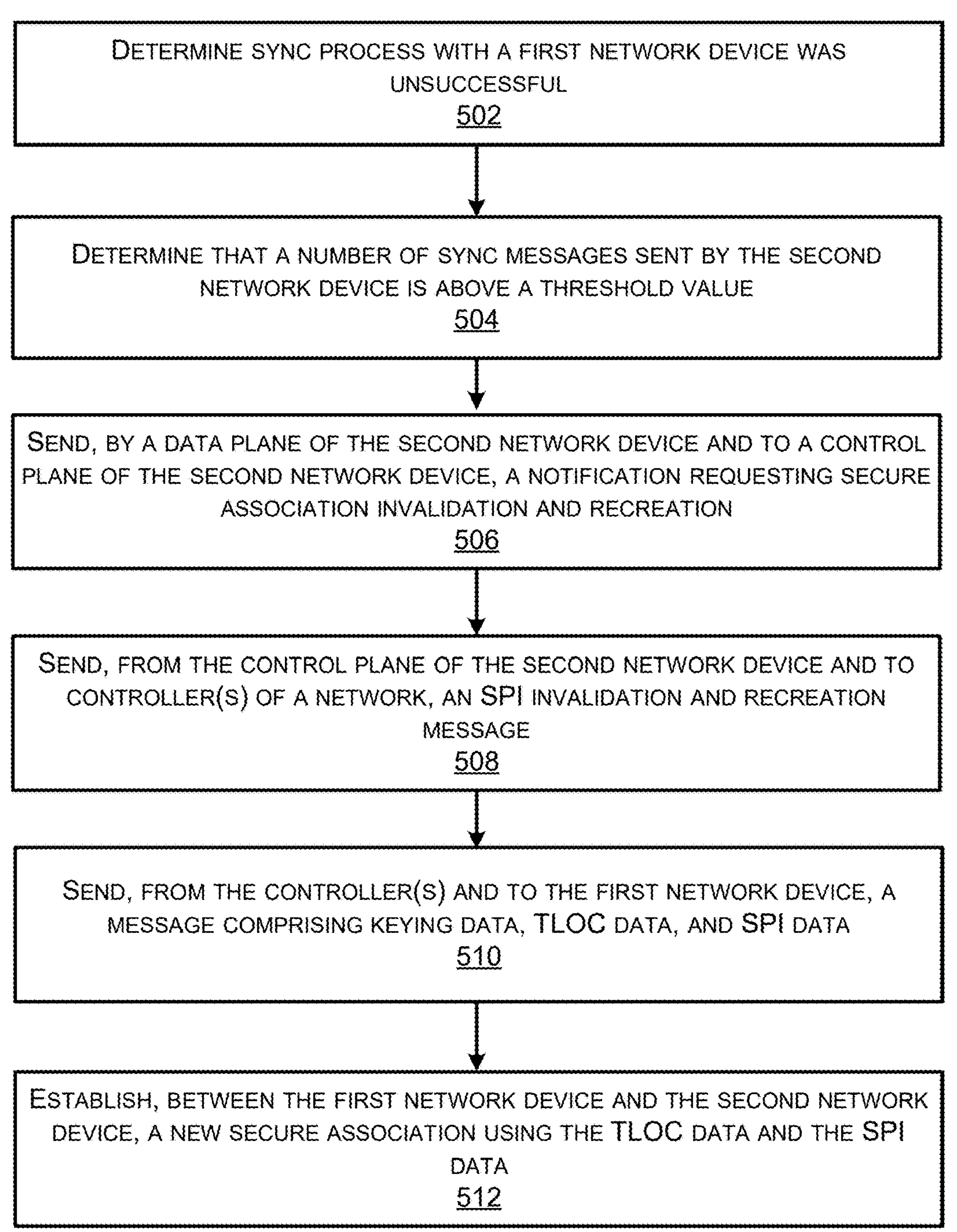
FIG. 5 illustrates a flow diagram of an example method for providing an automatic and lightweight solution to detect and resolve session stuck failure(s) due to erroneous anti-replay packet drops in SDWAN networks, associated with the system described in FIGS. 1-4.

FIG. 5 illustrates a flow diagram of an example system 500 for providing an automatic and lightweight solution to detect and resolve session stuck failure(s) due to erroneous anti-replay packet drops in SDWAN networks, associated with the system described in FIGS. 1-5. In some instances, one or more of the steps of system 500 may be performed by one or more devices (e.g., edge device(s) 106, network controller(s) 104, etc.) that include one or more processors and one or more non-transitory computer-readable media storing computer-executable instructions that, when executed by the one or more processors, cause the one or more processors to perform operations of system 500.

At 502, the system may determine that a sync process with a first network device was unsuccessful. For instance, the sync process may be unsuccessful where the second message and/or data packet(s) received from the first network device contain sequence numbers that have not been updated (e.g., sequence number value is unchanged) and/or where the sequence number value is not equal to or greater than the expected sequence number sent in the synchronization and recovery message.

At 504, the system may determine that a number of sync messages sent by the second network device is above a threshold value. For examples, the anti-replay component may be configured to determine that the synchronization and recovery process at the data plane of the network device(s) has been unsuccessful for more than a threshold number of attempts. For instance, the anti-replay component of the receiver network device may store a counter associated with a number of times the recover message is generated and sent. Once the counter reaches a threshold value, the anti-replay component may determine that an error is occurring on the sender network device side, as well as at the receiver network device, such that attempts to synchronize within the data plane may continue to be unsuccessful. In this example, and as a last resort, the system may determine that a control plane of the receiver network device should be notified in order to start a synchronization and recovery process (e.g., SPI invalidation and recreation via a specific TLOC update).

At 506, the system may send, by a data plane of the second network device and to a control plane of the second network device, a notification requesting secure association invalidation and recreation. For instance, the anti-replay component of the second edge device (operating in the data plane) may notify the control plane of the second edge device, the notification comprising a request for SA invalidation and recreation and including a specific TLOC and system IP.

At 508, the system may send, from the control plane of the second network device and to the controller(s) of a network, an SPI invalidation and recreation message. For instance, the control plane of the second network device may send a message to network controller(s) of an SDWAN network, the message comprising an SPI invalidation and recreation message and including the specific TLOC and the system IP received from the data plane. In some examples, the specific TLOC and system IP may be associated with the SA session and/or IPSec tunnel(s) established with the first network device.

At 510, the system may send, from the controller(s) and to the first network device, a message comprising keying data, TLOC data, and/or SPI data. For example, the network controllers may, in response to receiving the message, resend keying material to the sender network device along with the specific TLOC and SPI.

At 512, the system may establish, between the first network device and the second network device, a new secure association using the TLOC data and the SPI data. In some examples, the first network device may send data packets comprising ESP traffic with the sequence number(s) to the second device. For example, the first network device may then recreate and/or reestablish an IPSec SA with the controller(s). The first network device may send the TLOC invalidation and recreation update and acknowledgement to the second network device via the network controllers. The first network device and the second network device may then establish a new IPSec SA, the new SA utilizing a new sequence number value.

In this way, the system may provide a mechanism that enables the data plane to notify the control plane where sequence synchronization has failed (e.g., such as where there are out of window error(s) or other error(s) occurring at both a sending network device and a receiving network device) as a last resort mechanism. Thus, the techniques provide a fail-safe mechanism to rekey and re-establish secure connections in the control plane, while utilizing fewer communications and conserving processing thus improving processing capabilities of the network devices. Moreover, by leveraging the security of IPSec tunnels, the system may provide improved security by preventing of anti-replay attacks during stalls and/or synchronization between edge devices.

Figure 6:
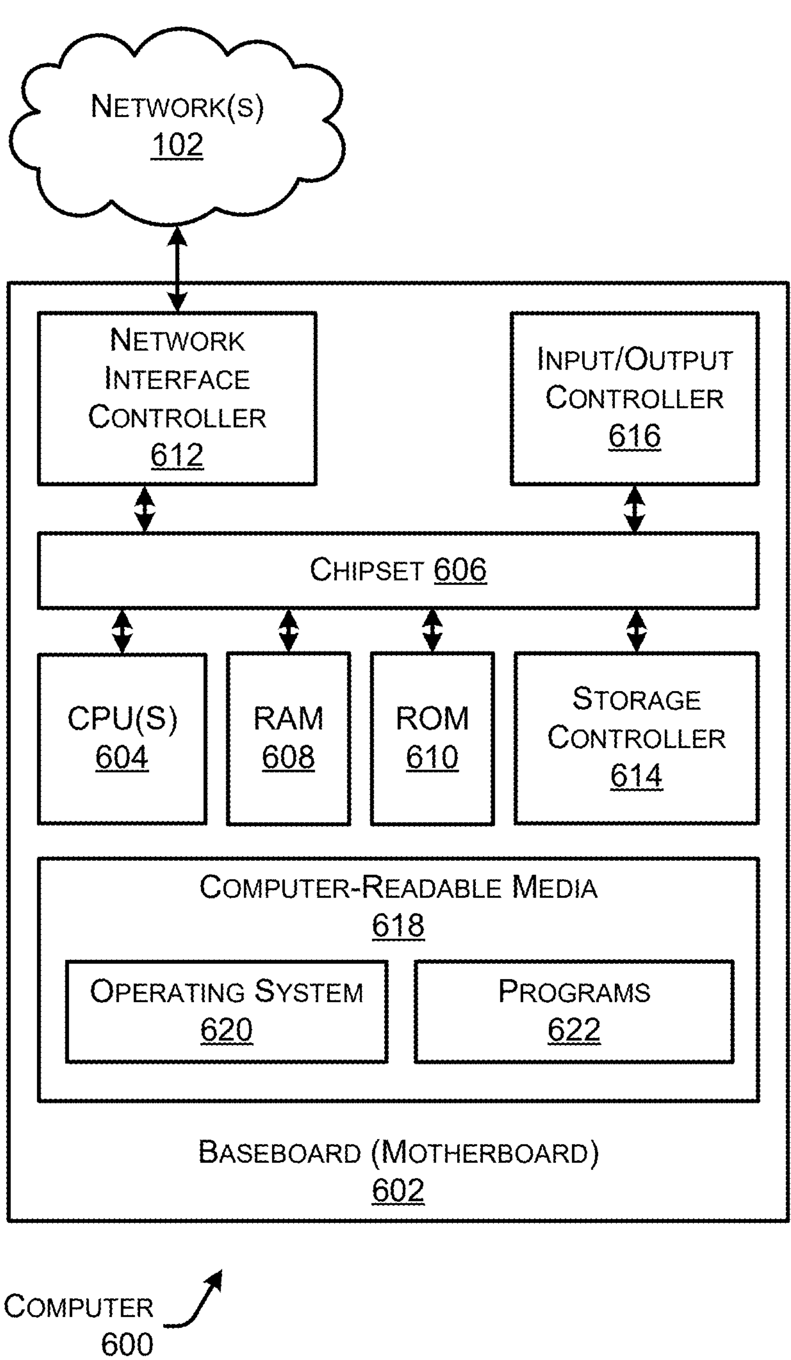
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer 600 may, in some examples, correspond to an edge device 106, a network controller 104, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network(s) 102. The chipset 606 can include functionality for providing network connectivity through a NIC 612, such as a gigabit Ethernet adapter. The NIC 612 is capable of connecting the computer 600 to other computing devices over the network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the edge device 106, network controller 104, and/or any components included therein, may be supported by one or more devices similar to computer 600. Stated otherwise, some or all of the operations performed by the edge device 106, network controller 104, and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a network device 106, and/or any other device. The computer 600 may include one or more hardware processors (processors) configured to execute one or more stored instructions. The processor(s) may comprise one or more cores. Further, the computer 600 may include one or more network interfaces configured to provide communications between the computer 600 and other devices, such as the communications described herein as being performed by the network device 106, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure. For instance, the programs 622 may cause the computer 600 to perform techniques for providing an automatic and lightweight solution to detect and resolve session stuck failure(s) due to erroneous anti-replay packet drops in SDWAN networks. In some examples, the techniques may be implemented by one or more network device(s). In some examples, the techniques may operate within a data plane of network(s) 102. In some examples, the techniques may include receiving, from a first edge device and at a second edge device within the SDWAN, first data packets comprising sequence numbers; determining, by the second edge device, that an out of window error has occurred at the second edge device; generating, by the second edge device, a first message comprising an expected sequence number; sending the first message to the first edge device, the first message causing the first edge device to perform a recovery process; receiving, from the first edge device and based at least in part the recovery process, one of a second message or second data packets comprising the expected sequence number; and updating, by the second edge device, a stored sequence number value based on the expected sequence number.

In this way, the computer 600 may provide a data plane IPSec sequence synchronization mechanism, such that edge devices can automatically and without manual intervention recover IPSec sequence values that would normally be lost due to erroneous anti-replay drops in SDWAN networks, thereby improving data plane operations within networks. Moreover, by leveraging the security of IPSec tunnels, the techniques provide improved security by preventing of anti-replay attacks during stalls and/or synchronization between edge devices. Moreover, by having a mechanism that enables the data plane to notify the control plane where synchronization has failed (e.g., such as where there are out of window error(s) or other error(s) occurring at both a sending network device and a receiving network device, the techniques provide a fail-safe mechanism to rekey and re-establish secure connections in the control plane, while utilizing fewer communications and conserving processing thus improving processing capabilities of the network devices.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of sequence synchronization and recovery within a software-defined wide area network (SDWAN), comprising:

receiving, from a first edge device and at a second edge device within the SDWAN, first data packets comprising sequence numbers;

determining, by the second edge device, that an out of sync error has occurred at the second edge device, wherein determining that the out of sync error has occurred comprises:

determining, by the second edge device that a stored sequence number does not match the sequence numbers in the first data packets, the sequence number being outside of a configured sequence window;

dropping one or more of the first data packets;

incrementing a drop counter stored by the second edge device; and determining that a drop rate or the drop counter is above a threshold value;

generating, by the second edge device, a first message comprising an expected sequence number;

sending the first message to the first edge device, the first message causing the first edge device to perform a recovery process;

receiving, from the first edge device and based at least in part on the recovery process, one of a second message or second data packets comprising a new sequence number; and updating, by the second edge device, a stored sequence number value based on the new sequence number.

2. The method of claim 1, wherein the method is performed automatically and within a data plane of the SDWAN.

3. The method of claim 1, wherein generating the first message further comprises setting a control bit within a header of the first message, the control bit causing the first edge device to perform the recovery process.

4. The method of claim 3, wherein the first message comprises an internet protocol security (IPSec) packet and is sent via an IPSec tunnel, the header comprising an encapsulated security payload (ESP) header, and the expected sequence number being included as part of a payload of the first message.

5. The method of claim 1, wherein the second edge device refrains from sending an acknowledgement message to the first edge device in response to receiving the second data packets or the second message.

6. The method of claim 1, wherein updating the stored sequence number is based on determining the new sequence number comprises a value that is equal to the expected sequence number or greater than the expected sequence number.

7. The method of claim 1, wherein the first message comprises a synchronization request, the method further comprising:

determining, by the second edge device, that the synchronization request has been sent more than a threshold number of times;

based on the synchronization request being sent more than the threshold number of times, sending, by the second edge device and to a control plane of the second edge device, a notification comprising transport locator (TLOC) data and system IP data;

receiving, from the first edge device, updated TLOC information; and establishing, with the first edge device, a new secure association and a new sequence number.

8. A system comprising:

one or more hardware processors; and one or more non-transitory computer-readable media storing instructions that, when executed by the one or more processors, cause the one or more processors to perform operations comprising:

receiving, from a first edge device and at a second edge device within a SDWAN, first data packets comprising sequence numbers;

determining, by the second edge device, that an out of sync error has occurred at the second edge device;

generating, by the second edge device, a first message comprising an expected sequence number, wherein generating the first message further comprises setting a control bit within a header of the first message, the control bit causing the first edge device to perform a recovery process;

sending the first message to the first edge device, the first message causing the first edge device to perform the recovery process, wherein the first message comprises an internet protocol security (IPSec) packet and is sent via an IPSec tunnel, the header comprising an encapsulated security payload (ESP) header, and the expected sequence number being included as part of a payload of the first message;

receiving, from the first edge device and based at least in part on the recovery process, one of a second message or second data packets comprising the expected sequence number; and updating, by the second edge device, a stored sequence number value based on the expected sequence number.

9. The system of claim 8, wherein the operations are performed automatically and within a data plane of the SDWAN.

10. The system of claim 8, wherein determining that the out of sync error has occurred comprises:

determining, by the second edge device that a stored sequence number does not match the sequence numbers in the first data packets, the sequence number being outside of a configured sequence window;

dropping one or more of the first data packets;

incrementing a drop counter stored by the second edge device; and determining that a drop rate or the drop counter is above a threshold value.

11. The system of claim 8, wherein the second edge device refrains from sending an acknowledgement message to the first edge device in response to receiving the second data packets or the second message.

12. The system of claim 8, wherein updating the stored sequence number is based on determining a new sequence number included in the second message or the second data packets comprises a value that is equal to the expected sequence number or greater than the expected sequence number.

13. The system of claim 8, wherein the first message comprises a synchronization request, the operations further comprising:

determining, by the second edge device, that the synchronization request has been sent more than a threshold number of times;

based on the synchronization request being sent more than the threshold number of times, sending, by the second edge device and to a control plane of the second edge device, a notification comprising transport locator (TLOC) data and system IP data;

receiving, from the first edge device, updated TLOC information; and establishing, with the first edge device, a new secure association and a new sequence number.

14. A method for performing sequence synchronization and recovery within a data plane of a software-defined wide area network (SDWAN), comprising:

sending, from a first edge device and to a second edge device within the SDWAN, first data packets comprising sequence numbers;

receiving, by the first edge device and from the second edge device, a first message comprising an expected sequence number, the first message including a set control bit;

updating, by the first edge device and in response to the first message, a stored sequence number based on the expected sequence number; and in response to updating the stored sequence number, sending, to the second edge device, at least one of a second message or second data packets comprising the updated sequence number, wherein the first edge device sends the second data packets, the second data packets comprising encapsulated security payload (ESP) traffic.

15. The method of claim 14, further comprising:

receiving, from a controller of the SDWAN, a third message comprising keying data associated with the first edge device, updated TLOC data, and security parameter index (SPI) data; and in response to receiving the third message, establishing, with the second edge device, a new secure association and a new sequence number.

16. The method of claim 14, wherein the first edge device sends the second message, the second message comprising an acknowledgement and the updated sequence number.

* * * * *